United States Patent
Seavers et al.

(10) Patent No.: US 7,257,090 B2
(45) Date of Patent: Aug. 14, 2007

(54) MULTI-SITE TELECONFERENCING SYSTEM

(75) Inventors: David Seavers, Dublin (IE); Bruce Walsh, Londonderry, NH (US); James Taggart, Andover, MA (US); Roger Moloney, Dublin (IE); Hugh Maguire, Dublin (IE); Dave McCarthy, Dublin (IE); Eamon Troy, Wicklow (IE)

(73) Assignee: Avaya Technology LLC, Basking Ridge, NJ (US)

( * ) Notice: Subject to any disclaimer, the term of this patent is extended or adjusted under 35 U.S.C. 154(b) by 1102 days.

(21) Appl. No.: 10/308,075

(22) Filed: Dec. 3, 2002

(65) Prior Publication Data

US 2003/0103468 A1 Jun. 5, 2003

Related U.S. Application Data

(60) Provisional application No. 60/334,583, filed on Dec. 3, 2001.

(51) Int. Cl.
*H04L 12/16* (2006.01)
*H04Q 11/00* (2006.01)

(52) U.S. Cl. ............. 370/260; 370/261; 370/270; 379/202.01; 379/205.01

(58) Field of Classification Search ........ 370/261–262, 370/264–265, 352–354, 260, 270; 379/202.01, 379/203, 205.01
See application file for complete search history.

(56) References Cited

U.S. PATENT DOCUMENTS

| | | | |
|---|---|---|---|
| 4,953,159 A | 8/1990 | Hayden et al. | 370/62 |
| 5,373,549 A * | 12/1994 | Bales et al. | 379/93.21 |
| 5,742,670 A * | 4/1998 | Bennett | 379/142.04 |
| 5,903,629 A | 5/1999 | Campbell, IV | 379/88 |
| 5,995,608 A * | 11/1999 | Detampel et al. | 379/205.01 |
| 5,999,609 A * | 12/1999 | Nishimura | 379/201.01 |
| 6,262,978 B1 * | 7/2001 | Bruno et al. | 370/260 |

(Continued)

FOREIGN PATENT DOCUMENTS

EP 0847178 A2 6/1998

(Continued)

OTHER PUBLICATIONS

Blum et al, IEEE Jour on Selected Areas in Comm, vol. 15, No. 3, Apr. 1997, pp. 576-588, A Development and Runtime Platform . . . .

(Continued)

*Primary Examiner*—Binh K. Tieu
(74) *Attorney, Agent, or Firm*—Chapin IP Law, LLC; David W. Rouille, Esq.; Barry W. Chapin, Esq.

(57) ABSTRACT

A teleconferencing system (1) comprises multiple teleconferencing bridges (5, 6, 7) each having an associated database (8, 9, 10). A server (20) hosts a local engine (22) associated with each bridge, and a multi-site engine (21). For a "global" conference utilising the resources of at least one other system (2), the multi-site engine (21) communicates over TCP/IP (36) with an equivalent multi-site engine of the other system to set up a link line via PSTN (31) between the bridges (5, 6, 7, 41). During the conference, the multi-site engine (21) automatically transmits event-driven updates to the remote system, and likewise receives such updates from the other system.

21 Claims, 1 Drawing Sheet

U.S. PATENT DOCUMENTS

| | | | |
|---|---|---|---|
| 6,501,740 B1* | 12/2002 | Sun et al. ................... | 370/261 |
| 6,728,221 B1* | 4/2004 | Shaffer et al. .............. | 370/260 |
| 6,967,672 B1* | 11/2005 | Huber et al. ............. | 348/14.08 |
| 7,119,828 B1* | 10/2006 | Kizhnerman et al. .... | 348/14.08 |
| 7,133,896 B2* | 11/2006 | Ogdon et al. .............. | 709/205 |
| 2003/0095644 A1* | 5/2003 | St-Onge et al. .......... | 379/88.17 |
| 2003/0224815 A1* | 12/2003 | Rodman et al. ............ | 455/517 |
| 2006/0274675 A1* | 12/2006 | Kizhnerman ................ | 370/254 |

FOREIGN PATENT DOCUMENTS

EP          0883306 A2     12/1998

OTHER PUBLICATIONS

Willebeek-LeMair et al, Computer Communications 20, 1997, pp. 157-168, Distributed video conferencing systems.

* cited by examiner

MULTI-SITE TELECONFERENCING SYSTEM

This is a complete application claiming benefit of provisional 60/334,583, filed Dec. 3, 2001.

FIELD OF THE INVENTION

The invention relates to teleconferencing systems.

PRIOR ART DISCUSSION

Teleconferencing systems have been available for many years. Typically a system comprises a telephone line switching or routing unit, called a "bridge". There is also typically an agent console for scheduling calls and handling other administrative functions. Conferees both local and remote can take part in a conference by dialling into the designated number and entering a required security code.

The arrangement has worked well in many circumstances. One example is a system based on a bridge marked by Spectel-Multilink under the name "C7000™". However in some circumstances the prior systems impose unsatisfactory limitations because of their limited capacity. For example, a particular multi-national business may have a situation where systems located in Europe are under-utilised during a day when its systems in USA are unable to cope with demand.

The invention is therefore directed towards providing for more efficient use of teleconferencing equipment and greater flexibility to meet demand at peak times at each of a number of remote locations.

SUMMARY OF THE INVENTION

According to the invention, there is provided a teleconferencing system comprising a teleconferencing bridge, an agent console, and a bridge database, wherein the system further comprises:

- a multi-site engine comprising means for communication with a multi-site engine of a remote teleconferencing system for transfer of control signals in real time for simultaneous operation of at least two systems for a single conference, and
- means in the bridge for establishing a link with a bridge of the remote system for communication of voice for operation of bridges of at least two systems for the conference.

In one embodiment, the bridge comprises means for establishing the link as a link line in a telecommunications voice network.

In one embodiment, the multi-site engine comprises means for communicating with the remote multi-site engine using a packet protocol.

In one embodiment, the packet protocol is TCP/IP.

In another embodiment, the system further comprises a local engine associated with the bridge and residing between the bridge and the multi-site engine.

In one embodiment, the system comprises a plurality of bridges, and a local engine associated with each bridge.

In a further embodiment, the multi-site engine comprises means for transmitting control signals in an asynchronous event-driven manner and for receiving such control signals from a remote multi-site engine.

In one embodiment, the system comprises means for categorising each event with an event type, and the multi-site engine comprises means for updating a configuration file and for deciding on onward routing of a signal to the local engine according to event type of the control signal.

In one embodiment, the multi-site engine comprises means for polling a multi-site engine of a remote system if a time period elapses without an asynchronous event.

In one embodiment, the agent console comprises means for writing a global flag to a bridge database to indicate scheduling of a multi-site conference, and the system comprises a bridge status function comprising means for automatically transmitting a control signal to a multi-site engine of a remote system requesting establishment of a link line between bridges of the systems.

In another embodiment, each database comprises means for initiating events before and after a conference for synchronisation with a bridge database of a remote system participating in a conference.

In one embodiment, each of the local engine, the multi-site engine, and the bridge layer comprises:
- a status communication object,
- a status container, and
- a policy object.

In one embodiment, the status communication object comprises means for listening for status change events, the status container comprises means for maintaining lists of state objects defining status of the conference, and the policy object comprises means for assisting with creation and destruction of other objects.

In one embodiment, the status container comprises means for associating a sequence number with each state.

BRIEF DESCRIPTION OF THE DRAWINGS

The invention will be more clearly understood from the following description of some embodiments thereof, given by way of example only with reference to the accompanying drawings in which.

DETAILED DESCRIPTION OF THE INVENTION

Figure 1:
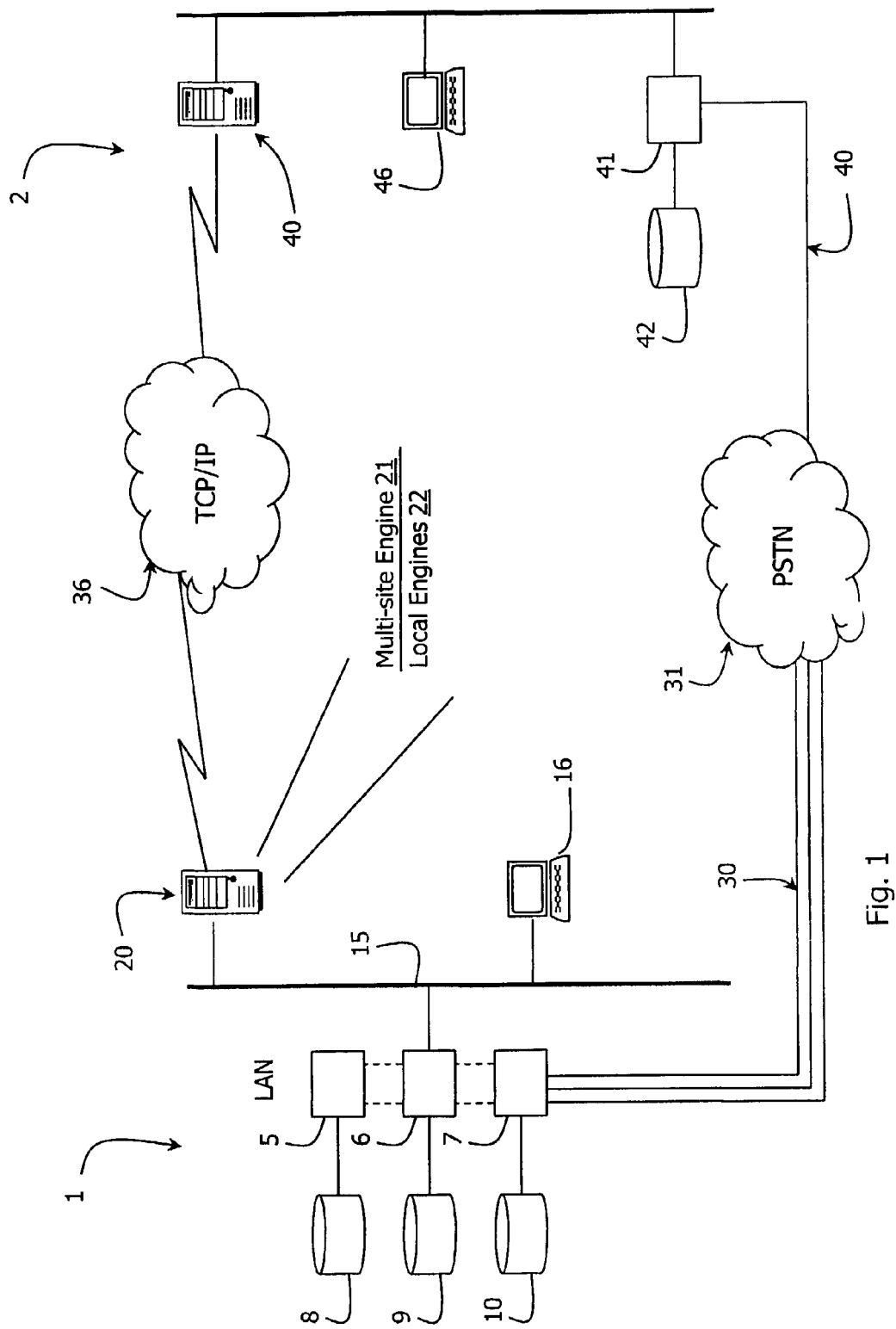
FIG. 1 is a diagram illustrating the architecture of two teleconferencing systems of the invention.

Referring to FIG. 1 two teleconferencing systems 1 and 2 are illustrated. Each system 1 and 2 may be referred to as a multi-site teleconferencing system because it is capable of linking with another system at a remote location so that resources are effectively pooled and are configured dynamically in a versatile manner to meet demand.

The system 1 comprises three bridges 5, 6, and 7, each linked with an associated database 8, 9, and 10 respectively. The bridges 5, 6, and 7 are connected to an 10/100 Ethernet™ LAN 15. An agent console 16 is also connected to the LAN 15. Finally, the system 1 also comprises a server 20 having a multi-site engine 21 and three local engines 22, each associated with one of the bridges 5, 6, and 7.

The bridges 5, 6, and 7 are connected by cabling 30 to a PSTN 31. The server 20 is configured for TCP/IP communication via a network 36.

The system 2 has the same general configuration as the system 1, however, in this case there is only one bridge. A server 40 has a multi-site engine, and a single local engine associated with the bridge 41, having a database 42. The bridge 41 is linked to the PSTN 31 by cabling 45. Finally, the system 2 comprises an agent console 46.

These two systems are given by way of example only. In general, a system of the invention may have any number of bridges, a local engine associated with each bridge, and a single multi-site engine. The engines may be hosted on any suitable number of hardware computers depending on required processing capacity.

It will be noted from the above that there are two forms of inter-system communication, namely:
(a) the PSTN 31 for bridge-to-bridge communication during a conference, and
(b) the TCP/IP network 36 (typically the Internet) for real time control signalling between the multi-site engines.

To set up a conference, the agent consoles 16 and 46 are used to interface with the bridges and their databases to schedule the conference. The scheduling allocates an appropriate number of conferences to each system 1 and 2 according to their capacities. Scheduling may require only one system for a conference, in which case the conference process in an conventional manner.

However, if a "Global" command is inputted at a console 16 or 46, a flag is written to a bridge database. This flag indicates that there must be synchronisation between all of the databases for the two (or more) systems involved. The multi-site engine (MSE) of the first system transmits a TCP/IP command to the MSE of the other system. In response, each local engine of the other system instructs its bridge to open a line via the PSTN 31 with the bridges of the first system. Henceforth, this link line is used to maintain communications between the systems 1 and 2 for conference call voice traffic.

Once the conference commences the local engine and the MSEs perform real time control signalling to ensure that all participating sites are synchronised to operate as one logical system.

Synchronisation is both asynchronously event driven, and also synchronously maintained by polling. For the former, any event which arises such an as input by a conferee of a query DMF tone causes the relevant bridge to inform its local engine, which in turn informs its MSE. The MSE in turn transmits via TCP/IP the event to the remote MSE, which informs the local engine, which informs its bridge. These signals are used by the MSEs to update the associated configuration files. The update signals are generated in real time, and so the configuration files are maintained in synchronisation. There are different event types. Some types require the update signal to go no further than the receiving MSE, others require it to go as far as the remote local engine, while others require it to go as far as the remote bridges.

The synchronous events arise after expiry of a time period in which no asynchronous events arise. Upon expiry, one of the MSEs automatically polls the other MSE, to determine status and update its configuration file with this status.

All of the control signalling passes between the MSEs, and it is all transmitted over TCP/IP. The packet sizes are maintained as small as possible to minimise bandwidth requirements.

Also, during the conference each bridge captures call detail data to its database. At the end of the conference, each bridge transmits call detail records (CDRs) to the other bridges so that any one database has all CDRs for the conference and the databases are in complete synchronism. Thus, any one bridge can be used for generation of the necessary billing and other reports.

In more detail a schedule function of a console supports scheduling on multiple systems and provides the agent with the ability to schedule a conference on a single bridge or on multiple bridges. The schedule function makes calls to a schedule interface to create, modify and delete conferences. There is a global conference ID—a unique and key field that references the conferences that are to take place on multiple and geographically dispersed bridges. The schedule function ensures that the global conference ID is unique on all the bridges that are part of a scheduled conference. It also ensures that the same participant's security code can be used on each bridge and that this security code is unique for the given date/time on all the bridges that are part of the conference. This requirement also holds for a moderator security code.

The scheduling is not relevant on a single point of failure or a component with too much overall system reliance. This allows end users and agents to schedule global conferences without changing the scheduling infrastructure for scheduling local conferences. This has been achieved by virtue of the distributed schedule databases 8, 9, 10, and 42 connected to the bridges.

The schedule function globally aggregates the interfaces to each bridge database. Each schedule interface uses a reserve/commit technique to schedule a global conference across all nodes on the site(s). This reserve/commit is important such that if the reservation has a conflict due to not enough ports, or code conflict on any one bridge, the schedule as a whole comes back with the appropriate notification. Only when the conference can be reserved across of all the bridges, is the reservation committed and actually scheduled.

Each MSE uses a configuration file and this file is common to all of the systems. The MSE assumes that the configuration file on each system lists all the bridges for the system in the order of importance of each bridge. The configuration file also lists the IP address, UDP port to connect through, and the telephone number for each bridge. The MSE uses the order of importance to determine the least expensive links between the various bridges for least cost routing. The MSE uses this information to set up the links, once a multi-bridge conference starts up.

A Global Conference is controlled by a system 1 or 2 with a Master Conference Status for the conference. This controlling system decides how link lines are established, how distributed conference commands (such as secure and lecture) are handled, and when the conference should be hung up. Each Global Conference has a Master Conference Status record.

The servers 20 and 40 are organised into three "layers":
a bridge status layer,
the multi-site engine layer, and
the local engine layer.

Each layer is divided into three major objects:
a status communication object,
a status container, and
a policy object.

In general, the status communication object listens for status change events and communicates these changes to other layers and may update the status container information.

The status container contains lists of state objects that encapsulate the current state of activities of interest in the system. It also fires status-changed events to notify other objects that some state has changed. Every state object has a sequence number in it. Whenever a state object is changed, its sequence number is also incremented. When a status change message is acknowledged by a receiving object in another part of the system or a different system, the sequence number of the object sent is included in the message, so that delivery is known.

The policy object makes decisions and assists in the creation and destruction of other objects in the system.

Bridge Status Layer

The bridge layer is responsible for establishing and maintaining communication with other systems, and keeping track of which system has the Global Conference Status record for each Global Conference currently active. It is essentially at a higher level than the MSE.

Initialisation

When the bridge layer starts up, a BridgePolicy object reads the local configuration file and loads all of the static bridge information into a BridgeStatusContainer object. It also initialises a MasterConferenceContainer, where it will hold master conference records. It then prepares a BridgeStatus object for itself and causes it to send a BridgeStatusChanged event to the BridgeStatusCommunication object.

The BridgeStatusCommunication object tries to determine who its "nearest" active neighbours are by attempting to open a TCP/IP socket with them, using the information in the BridgeStatusContainer. Once it establishes communication, it sends the BridgeStatus information over to them.

The receiving BridgeStatusCommunication objects on the other systems first attempt to update the information for that system in the BridgeStatusContainer. Since the bridge is first coming up, the receiving bridge passes the BridgeStatus on to its neighbours, so eventually every active bridge in the system will know that the new bridge is available. Furthermore, the receiving bridge sends all the information it has about active bridges and all of its MasterConference records back to the original bridge. A MasterConference record contains the GlobalConferenceID, and the IP Address of the bridge that is the conference master for this global conference.

If a new Global Conference starts on a system, the LocalStatusPolicy calls BridgePolicy:NewGlobalConference. The BridgePolicy looks in the MasterConferenceContainer. If it finds a matching GlobalConferenceID, then the conference already exists and has a Global Conference Master. If it does not find it, then it assumes this is a totally new Global Conference. It creates a new MasterConference record and adds it to the container (which triggers an event that will cause this MasterConference record to be passed around the system so that all bridges hear about it).

It also creates a new GlobalConferenceStatus record and adds it to the GlobalConferenceStatus container.

Using a timer, the BridgePolicy object increments the sequence number in its local BridgeStatus object. This triggers a BridgeStatusChanged event that is received by the system's "neighbours." If a system does not hear from a neighbour for an extended period of time, it decides that either it or the neighbour is no longer communicating. It deletes its known neighbour information and redoes the process of determining who its neighbours are.

Local Layer

The Local Layer is responsible for establishing and maintaining communication with an associated local bridge, controlling the bridge on advice from the global layer, and keeping track of a Local Conference Status record for each Global Conference currently active.

When the local layer starts up, a LocalPolicy logs into the BridgeInterface, to establish communication with the associated bridge. It then sends a GetConferenceStatus command to the BridgeInterface, with a GlobalConferenceID of 0. This causes the BridgeInterface to send ConferenceStatusChanged records for each GlobalConferenceID (via the ConferenceStatusChanged listener).

This provides a list of all global conferences active on the bridge to the LocalPolicy. It then issues a GetStaticConferenceInfo request for each global conference. The BridgeInterface returns a StaticConferenceInfo record (GlobalConferenceID, conference name, moderator security code, and whether the conference must wait for a moderator). With that data, the LocalPolicy builds a LocalConferenceStatus record. It calls BridgePolicy.NewGlobalConference (see the Bridge Layer/New Global Confernce section). The LocalPolicy then adds the LocalConferenceStatus record to the LocalConferenceStatusContainer.

Changing the LocalConferenceStatusContainer triggers a LocalConferenceStatusChanged event that wakes up the LocalStatusComm object. It queries the Bridge layer for the IP address of the Conference Master for this Global Conference, and sends the LocalConferenceStatus record to the Global Layer.

When a call comes into the bridge that starts a new Global Conference, the BridgeInterface sends a ConferenceStatusChanged record to the listener, the LocalPolicy. The behaviour of the system from there is the same as for initialisation. The LocalPolicy issues a GetStaticConferenceInfo request for this conference. It builds a LocalConferenceStatus record and calls BridgePolicy.NewGlobalConference (see the Bridge Layer/New Global Confernce section). The LocalPolicy then adds the LocalConferenceStatus record to the LocalConferenceStatusContainer.

If an event occurs that causes a Global Conference on the bridge to change, the BridgeInterface fires a ConferencStatusChanged record. This change might be an attendee or a moderator arriving or leaving, a link line arriving or leaving, or the lecture or secure state of the conference changing. In any case, the LocalPolicy simply updates the LocalConferenceStatusContainer, and the LocalStatusComm object subsequently informs the GlobalStatus layer of the change.

Global Layer

The Global Layer is responsible for maintaining the state of Global Conferences, and managing them. In some ways, it has the least to do, but it also is the most important.

The BridgePolicy, as a part of its NewGlobalConference method creates a new GlobalConferenceStatus record and adds it to the GlobalConferenceStatus container. Again there is nothing further to do. A GlobalConferenceStatus record contains information about the global state of the conference and a set of LocalConferenceStatus segments that reflect the current state of each LocalConference associated with it.

Eventually, the LocalStatusComm object sends a LocalConferenceStatus record to the Global Layer. The GlobalStatusComm object reads the information and updates the GlobalConferenceStatus record, adding the LocalConference segment for this bridge. The GlobalPolicy listener is notified by this change, but has to take no action. That state remains true until a second bridge joins the conference When another bridge joins the conference, the GlobalStatusComm object acts as it did for the first bridge. The GlobalPolicy listener, on the other hand, now has to take some action. GlobalPolicy calls ParseStatusChangeEvent, and then, if some change in the global conference state is required, sends commands to the appropriate bridges to effect those changes. Possible changes are: add link line, remove link line, hang up the conference, and secure or lecture the conference.

Since systems communicate with each other using TCP/IP, a scheme is laid over that to ensure reliability. The base object for the communication objects (SsStatusComm) establishes a model that is followed by (most of) the communication objects. The state of the objects being sent is synchronised through the use of sequence numbers.

Every object that can be associated with an event has a sequence number. Whenever the system changes the object it bumps the sequence number. The change triggers a StatusChanged event, and SsStatusComm is a status changed listener. The event gets queued in the ChangedEventQueue. An event refers to a single object. When an event occurs to an object, the object's current sequence number is stored in the event.

A secondary thread handles message sending. The thread removes objects from the ChangedEventQueue, but does nothing with them if the event sequence number does not match the object sequence number (if multiple events occur to the same object, only the last event gets processed). If the sequence number matches, then the event needs to be sent. Every message has a sequence number also. When it sends the message, it writes the sequence number of the message and a timestamp in the event object and (if the event Resend Boolean is true) add the event to the ResendEventQueue. There is no need to queue messages. When the message is acknowledged, it runs through the ResendEventQueue looking for events that have the matching message sequence number, and removes the event from the queue. If the event is in the ResendEventQueue longer that the resend threshold, it gets moved back to the ChangedEventQueue (by putting it back in the ChangedEventQueue, it will only get resent if it is appropriate. If the object has changed in the interim, then the requeued event would be ignored.

Bridge-dependent Engine API
  Functions required in this API: All bridges that are part of the system must support all of the functions in this API.

Status
GetConferenceStatus(GlobalConferenceID)
  Query the state of global conferences given Global Conference ID. Response includes the following:
  Global Conference ID (key)
  Conference schedule information
    Moderator hang-up flag (conference is hung up when last moderator exits)
  Conference State Information
    Lecture
    Secure
  Current resources used
    Number of user lines
    Number of moderator lines
  Active Link Lines: LinkA and LinkB (2 links per conference per bridge, maximum)
    Bridge ID, GlobalConferenceID, ModeratorSecurityCode, LineID
GetStaticConferenceInfo(GlobalConferenceID)
  Query the static information of global conferences given Global Conference ID. Response includes the following:
  Global Conference ID (key)
  Static conference information:
    Conference name
    Conference Moderator Pass Code (required for linking)
    Moderator Start flag (participants hear music until first moderator joins)
AddConferenceStatusChangedListener()
  Listen for conference state changed events
RemoveConferenceStatusChangedListener()
  Stop listening for conference state changed events
FireConferenceStatusChanged(event)
  Send notification of status change to a Global Conference. Data is the same as the response to GetConferenceStatus message Commands
AddLink(bridgerID, securityCode, startingLine, Phone)
  Access a line (starting with startingLine), dial the phone number of the other bridge. When it answers, play the VLL queue and the securityCode. Mark the line as a VLL and as a moderator.
HangupLink(LineID)
  Hang-up Link line—given Line ID
Hangup(GlobalConferenceID)
  Hang-up Conference—Given Global Conference ID
SecureConference(GlobalConferenceID)
  Set Conference Secure
LectureConference(GlobalConferenceID)
  Set Conference Lecture The invention is not limited to the embodiments described but may be varied in construction and detail.

The invention claimed is:

1. A teleconferencing system comprising a teleconferencing bridge, an agent console, and a bridge database, wherein the system further comprises:
  a multi-site engine comprising means for communication with a multi-site engine of a remote teleconferencing system for transfer of control signals in real time for simultaneous operation of at least two systems for a single conference;
  means in the bridge for establishing a link with a bridge of the remote system for communication of voice for operation of bridges of at least two systems for the conference; and
  wherein the agent console comprises means for writing a global flag to a bridge database to indicate scheduling of a multi-site conference, and the system comprises a bridge status function comprising means for automatically transmitting a control signal to a multi-site engine of a remote system requesting establishment of a link line between bridges of the systems.

2. A teleconferencing system as claimed in claim 1, wherein the bridge comprises means for establishing the link as a link line in a telecommunications voice network.

3. A teleconferencing system as claimed in claim 1, wherein the bridge comprises means for establishing the link as a link line in a telecommunications voice network; and wherein the multi-site engine comprises means for communicating with the remote multi-site engine using a packet protocol.

4. A teleconferencing system as claimed in claim 3, wherein the packet protocol is TCP/IP.

5. A teleconferencing system as claimed in claim 1, further comprising a local engine associated with the bridge and residing between the bridge and the multi-site engine.

6. A teleconferencing system as claimed in claim 1, further comprising a local engine associated with the bridge and residing between the bridge and the multi-site engine; and wherein the system comprises a plurality of bridges, and a local engine associated with each bridge.

7. A teleconferencing system as claimed in claim 1, wherein the multi-site engine comprises means for transmitting control signals in an asynchronous event-driven manner and for receiving such control signals from a remote multi-site engine.

8. A teleconferencing system as claimed in claim 7, wherein the system comprises means for categorising each event with an event type, and the multi-site engine comprises means for updating a configuration file and for deciding on onward routing of a signal to the local engine according to event type of the control signal.

9. A teleconferencing system as claimed in claim 1, wherein the multi-site engine comprises means for polling a multi-site engine of a remote system if a time period elapses without an asynchronous event.

10. A teleconferencing system as claimed in claim 1, wherein the agent console comprises means for writing a global flag to a bridge database to indicate scheduling of a multi-site conference, and the system comprises a bridge status function comprising means for automatically transmitting a control signal to a multi-site engine of a remote system requesting establishment of a link line between bridges of the systems; and wherein each database comprises means for initiating events before and after a conference for synchronisation with a bridge database of a remote system participating in a conference.

11. A teleconferencing system as claimed in claim 1, wherein the agent console comprises means for writing a global flag to a bridge database to indicate scheduling of a multi-site conference, and the system comprises a bridge status function comprising means for automatically transmitting a control signal to a multi-site engine of a remote system requesting establishment of a link line between bridges of the systems; and wherein each database comprises means for initiating events before and after a conference for synchronisation with a bridge database of a remote system participating in a conference; and wherein each of the local engine, the multi-site engine, and the bridge layer comprises:
   a status communication object,
   a status container, and
   a policy object.

12. A teleconferencing system as claimed in claim 11, wherein the status communication object comprises means for listening for status change events, the status container comprises means for maintaining lists of state objects defining status of the conference, and the policy object comprises means for assisting with creation and destruction of other objects.

13. A teleconferencing system as claimed in claim 11, wherein the status communication object comprises means for listening for status change events, the status container comprises means for maintaining lists of state objects defining status of the conference, and the policy object comprises means for assisting with creation and destruction of other objects; and wherein the status container comprises means for associating a sequence number with each state.

14. A computer readable medium having computer readable code thereon for a teleconferencing bridge, an agent console, and a bridge database, the medium comprising:
   instructions for communication with a multi-site engine of a remote teleconferencing system for transfer of control signals in real time for simultaneous operation of at least two systems for a single conference; and
   instructions for establishing a link with a bridge of the remote system for communication of voice for operation of bridges of at least two systems for the conference; and
   instructions for writing a global flag to a bridge database to indicate scheduling of a multi-site conference, and the system comprises a bridge status function comprising means for automatically transmitting a control signal to a multi-site engine of a remote system requesting establishment of a link line between bridges of the systems.

15. The computer readable medium as claimed in claim 14, further comprising instructions wherein the bridge comprises means for establishing the link as a link line in a telecommunications voice network.

16. The computer readable medium as claimed in claim 14, further comprising instructions wherein the bridge comprises means for establishing the link as a link line in a telecommunications voice network; and wherein the multi-site engine comprises means for communicating with the remote multi-site engine using a packet protocol.

17. The computer readable medium as claimed in claim 14, further comprising instructions for a local engine associated with the bridge and residing between the bridge and the multi-site engine.

18. The computer readable medium as claimed in claim 14, further comprising instructions for a local engine associated with the bridge and residing between the bridge and the multi-site engine; and wherein the system comprises a plurality of bridges, and a local engine associated with each bridge.

19. The computer readable medium as claimed in claim 14, wherein the instructions for the multi-site engine comprises instructions for transmitting control signals in an asynchronous event-driven manner and for receiving such control signals from a remote multi-site engine.

20. The computer readable medium as claimed in claim 19, further comprising instructions wherein the system comprises means for categorizing each event with an event type, and the multi-site engine comprises means for updating a configuration file and for deciding on onward routing of a signal to the local engine according to event type of the control signal.

21. The computer readable medium as claimed in claim 14, further comprising instructions wherein the multi-site engine comprises means for polling a multi-site engine of a remote system if a time period elapses without an asynchronous event.

* * * * *